Aug. 5, 1952   A. E. IRVING   2,605,782
LIQUID LEVEL CONTROLLER

Filed June 29, 1948   3 Sheets-Sheet 1

INVENTOR.
ARTHUR E. IRVING
BY

Aug. 5, 1952    A. E. IRVING    2,605,782
LIQUID LEVEL CONTROLLER
Filed June 29, 1948    3 Sheets-Sheet 3

INVENTOR.
ARTHUR E. IRVING
BY

Patented Aug. 5, 1952

2,605,782

UNITED STATES PATENT OFFICE 2,605,782

LIQUID LEVEL CONTROLLER

Arthur E. Irving, East Rochester, N. Y.

Application June 29, 1948, Serial No. 35,871

4 Claims. (Cl. 137—412)

The present invention relates to liquid feed regulators of a type in which a feed tank is connected to a continuous supply and in turn feeds liquid, intermittently and as needed to another tank or apparatus in limited maximum quantity and it has for its general object to provide a simple, durable and dependable apparatus of this nature.

Its use is contemplated in connection, for instance, with the evaporating systems of furnaces or other heating units that contribute proper relative humidity to conditioned hot air supplies and the invention has for a further principal object to provide the regulator as a distinct individual unit capable of operating at a distance from and in an appropriate environment other than the hot, moist and corroding vicinity of the humidifier that it feeds.

A further object is to provide a regulator which, though it itself transmits the water or other liquid in controlled quantities and has its own liquid level to maintain, does so without exposing its own operating and actuating instrumentalities to moisture and corrosion from within.

Still another object of the invention is to provide a regulator that will feed to a vaporizing pan in small quantities at a time to avoid supplying a sudden rush of cold water to the pan to bring it up to level all at once with the consequence that the new filling takes time to heat and vaporize again and its moistening function is interrupted.

To these and other ends the invention resides in certain improvements and combinations of parts, all as will be hereinafter more fully described, the novel features being pointed out in the claims at the end of this specification.

In the accompanying drawings forming part of the specification:

Similar reference numerals throughout the views indicate the same parts.

Figure 1:
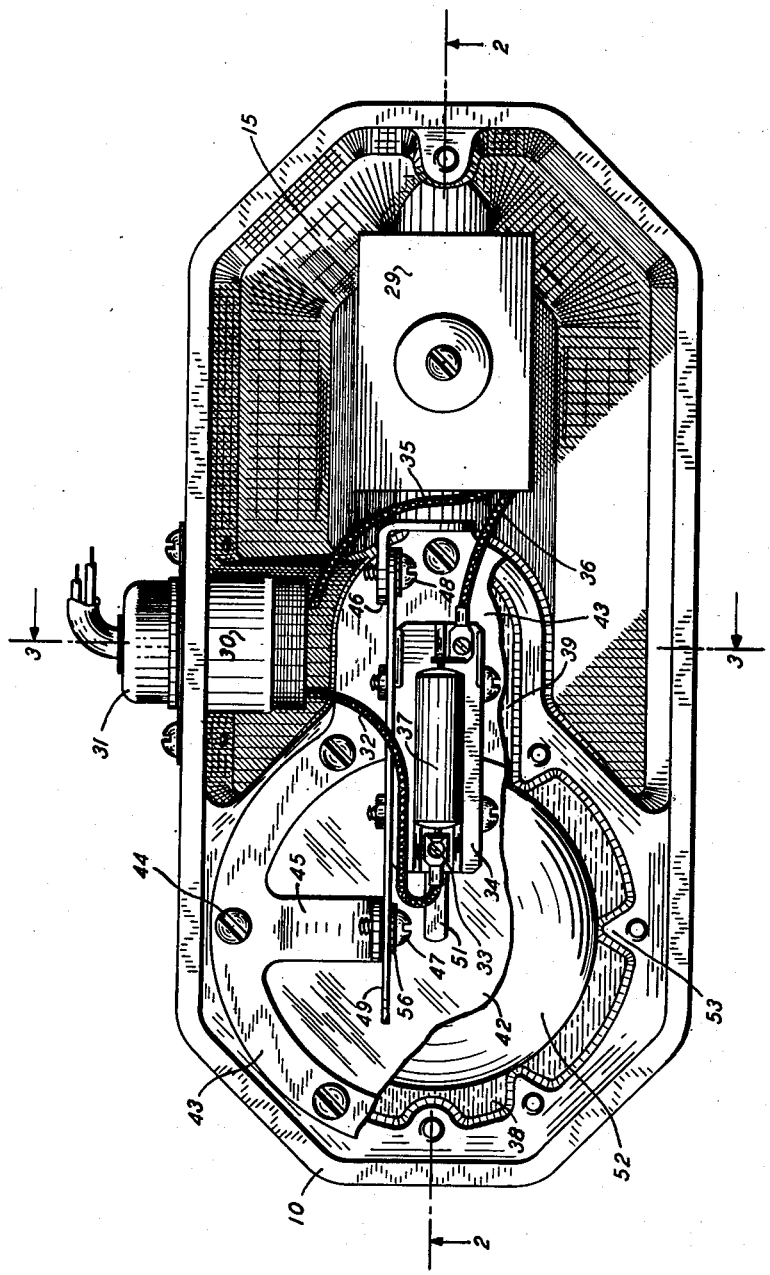
Fig. 1 is a top plan view of the interior of a liquid feed regulator constructed in accordance with and illustrating one embodiment of my invention, the cover of the casing being removed and portions of the tank covering being broken away.

Referring more particularly to the drawings 10 indicates the body and 11 the cover of a preferably cast or molded casing, the cover being normally sealed in position by fastening screws 12. The general interior is divided into a tank chamber 13 and an instrument chamber 14. The latter extends beneath the cover from end to end above the tank chamber but also extends downwardly beside the latter in a compartment 15. All of the instrument chamber including compartment 15 is liquid sealed at all times from the tank chamber and its connections as will appear.

The intake connection for tank 13, say from a main water line or similar constant supply, is indicated at 16 and, through a passage 17, leads to a valve chamber 18. This latter is in a cavity or bore in the casing extending to the bottom thereof but closed by a threaded plug 19 in which is formed an angular continuing passage 20 registering through an annular groove formed between the head of plug 19 and the adjacent casing with a final section of intake passage 21 that delivers directly into the tank chamber 13. The top of plug 19 furnishes a valve seat 22 in connection with passage 20 for a shut off to the tank chamber.

The upper portion of the valve chamber cavity 18 is also threaded to receive a watertight gland 23 supporting a vertical guide tube 24 for a valve head 25 that cooperates gravitationally with seat 22 to shut off the intake when the solenoid is deenergized. This is a solenoid valve and the valve head is suitably secured to an iron core 26 within the guide tube. A rubber or similar head 27 is adapted to abut a water tight cap assembly 28 at the top of tube 24 and absorbs the shock when the valve unit is projected upwardly to open the intake passages. This, obviously, will occur when the field winding 29 is electrically energized which is the case in the showing of Fig. 2. The field coil 29 surrounds guide tube 24 and is confined between gland 23 and cap assembly 28, all of the last described structure being of course in watertight instrument chambers 14—15 as well as the related units about to be described.

Figure 4:
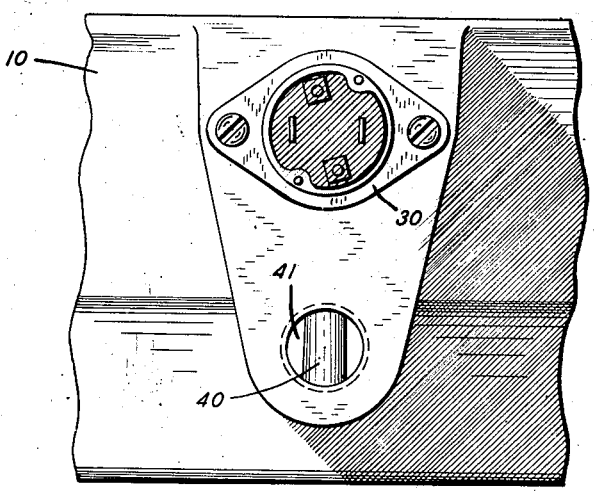
Fig. 4 is a fragmentary view of the rear of the casing showing the liquid outlet and the electrical connection receptacle with plug removed.

On the rear wall of the casing and extending into chamber 14 is a socket 30 (Figs. 1 and 4) and its housing for the attachment of a plug 31 connected with an electric supply source. One lead wire 32 therefrom goes to one binding post 33 of a small differential switch 34 while the other wire 35 is connected to a terminal of the solenoid field winding 29. The other field terminal is connected by a wire 36 with the other binding post of the switch. The solenoid and electric valve it actuates to retract the same is thus in a circuit controlled by switch 34. Over the switch and connecting the terminals thereof I have shown a suitable condenser 37 provided to prolong the life of the switch contacts and to eliminate static interference in radio receivers.

The tank chamber 13 consists of a larger, substantially cylindrical portion 38 at the end of the casing adjoining a reduced portion 39 near the center. In the reduced portion is an overflow and vent pipe 40 draining through the bottom of the casing midway thereof. Thus the otherwise sealed regulator unit, being usually outside of and remote from the liquid consuming unit it supplies, any failure of the within contained instrumentalities, either electrical or mechanical, that causes the tank to flood will be immediately perceived and remedial action can be taken to restore the function.

Figure 3:
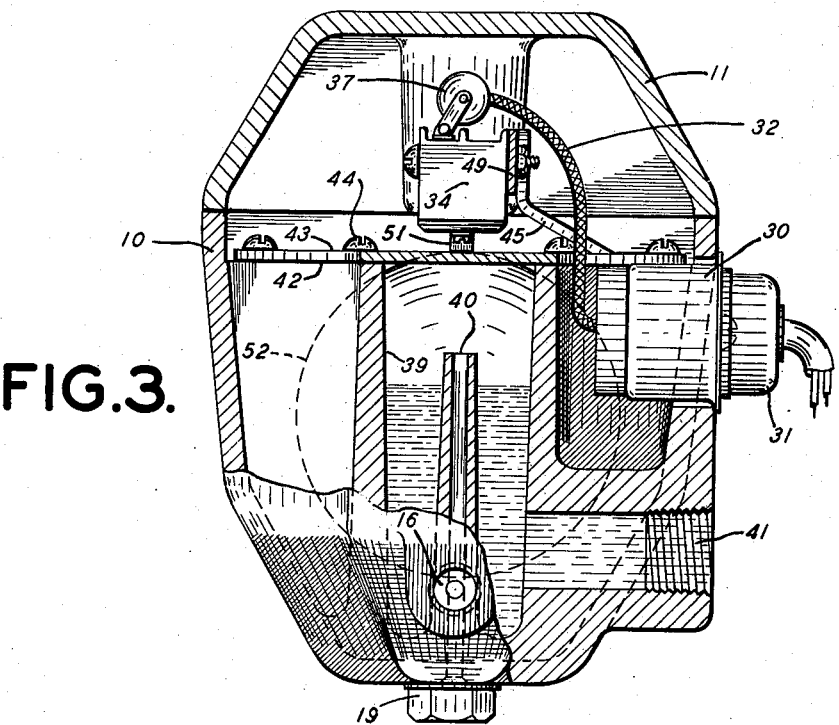
Fig. 3 is a transverse vertical section taken on the line 3—3 of Fig. 1 looking in the direction of the arrows and showing the liquid inlet, liquid outlet and the overflow.

The discharge or service outlet 41 (Figs. 3 and 4) from the tank proceeds from the reduced portion 39 thereof through the rear wall of the casing 10 below electrical socket 30.

This completes the description of the course of the liquid flow.

The tank chamber (Figs. 1 and 2) is provided with and sealed by a liquidtight cover consisting largely in the present embodiment, of a thin, pliable gasket diaphragm 42 which is in turn clamped in place on the rim of the tank by a partially annular plate or ring 43 and screws 44. When so sealed, no moisture can escape into the instrument chamber 14—15. Bracket arms 45 and 46 struck up from clamping plate 43 support, by screws 47 and 48, a beam 49 that in turn supports switch housing 34.

Figure 2:
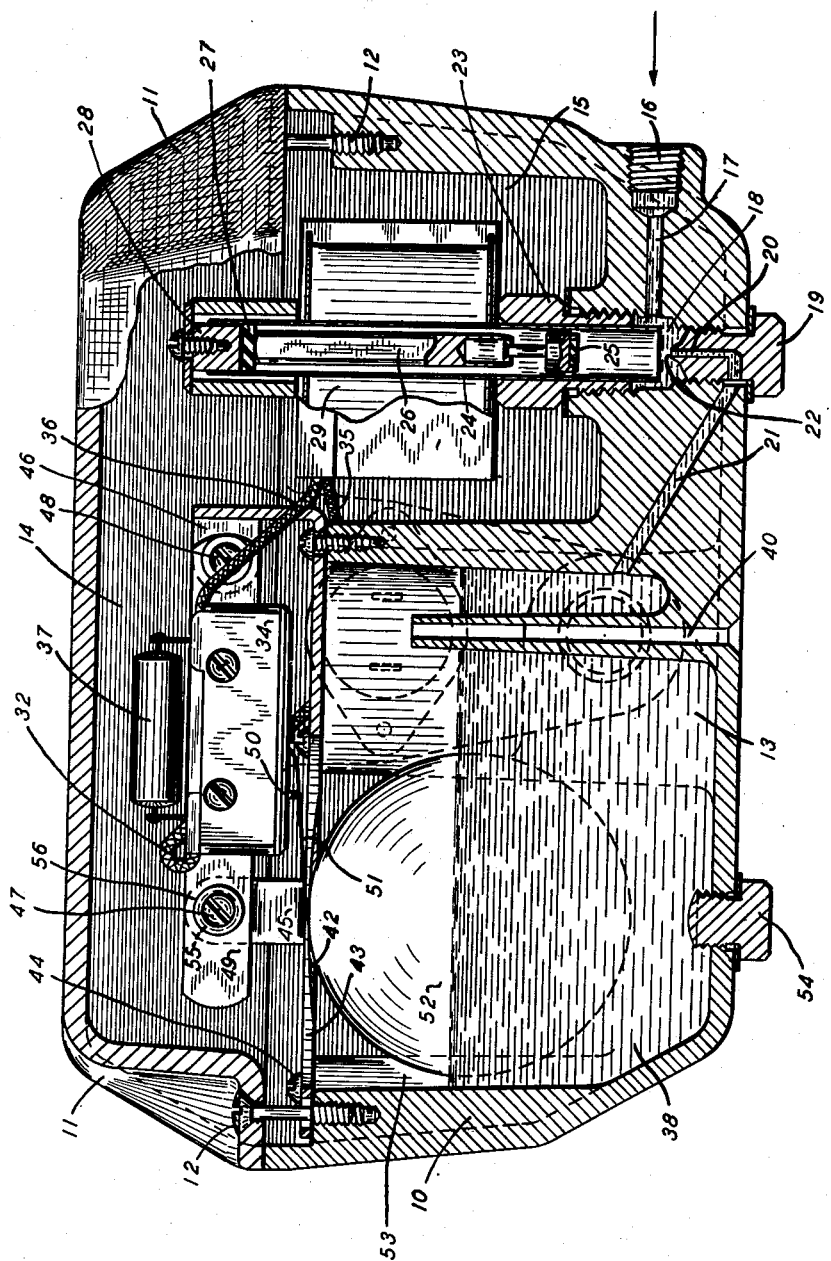
Fig. 2 is a longitudinal central section therethrough with the cover in place taken on the line 2—2 of Fig. 1 but showing certain parts in elevation or partially broken away.

The switch is operated from without by a plunger 50 (Fig. 2) which, when pushed in, breaks the circuit previously described but the tendency of the plunger is to protrude and hold the circuit closed thus energizing the solenoid valve 29 and maintaining it open as in Fig. 2. But contacting with the plunger or in position to contact therewith when raised is a spring arm 51 fulcrumed on the bottom of the switch housing and resting at its free end centrally on diaphragm 42. A free floating ball float 52 contained in the tank 38 rises with the liquid level and when that level reaches the maximum desired, the ball thrusts against the diaphragm and displaces it upwardly. This localized pressure by the float is sufficient, such as its buoyancy, to raise spring arm 51, depress plunger 50 and break the circuit at the switch. Hence the solenoid valve is deenergized, drops by gravity to its seat 22 and cuts off the intake flow which is not restored until sufficient liquid has been fed through outlet 41 to repeat the cycle. In the figures, the mechanism is shown in the tank filling position just before the control point deenergizing the solenoid valve) is reached.

The tank portion 38, above described as substantially cylindrical, is preferably provided with vertical fins 53 (Fig. 1) on its walls to reduce frictional contact and render the guides which they furnish self-clearing by the movements of the ball so that there will be no tendency for the latter to become stuck though it is held in its movement to a small contact area on the diaphragm.

A plug 54 on the bottom of the casing gives limited access to the tank without removing its cover and is used to drain and clean it when desired. In this connection it will be observed that by removing this plug and also valve seat plug 19, all liquid everywhere can be drained from the apparatus because of the positions of the inlet passages 17, 20 and 21 and the valve chamber 18.

It will be noted that the working level within the regulator can be predetermined and installation instructions can state that such is, say, 1½ inches below the case top with the cover removed. It will also be noted that this working level can be made to roughly coincide with the desired level in the controlled vessel, such as a vaporizing pan, at the time of installation by raising or lowering the regulator. Close adjustment of fluid level can then be effected by means of screws 47 and 48 (Fig. 2) which, when loosened, permit the pivoting of beam 49 about screw 48 and the raising or lowering of the beam because of an enlarged hole 55 (Fig. 2) in the latter behind screw 47 and clamp washer 56. This varies the amplitude of switch controlling arm 51 and hence the degree to which the diaphragm must be flexed to deenergize the solenoid valve and allow it to drop to closed position.

In the event of electrical failure the valve remains closed and there is no flow. In the event of mechanical failure the liquid level will rise and the liquid will overflow as described. Moreover, it will be noted that the valve is either fully open or fully closed so that no throttling action occurs.

While I have shown and described the preferred embodiment and use or application of my invention, it will be obvious to those skilled in the art that various changes and modifications may be made therein and other uses will suggest themselves without departing from the spirit of my invention.

I claim as my invention:

1. In a liquid feed regulator, the combination with a casing interiorly divided into a tank chamber and an instrument chamber liquid sealed therefrom and disposed above and beside the same, and inlet and discharge passages connected with the tank chamber, of a normally closed gravity operated solenoid valve controlling the intake passage and having its field winding located in the instrument chamber, part of which latter is defined by a closure for the tank chamber embodying a flexible diaphragm, an electric circuit connection to the casing including the solenoid field winding, a normally closed switch in said circuit mounted on the tank chamber closure and embodying a breaker arm cooperating with and contiguous to the diaphragm, and a float in the tank chamber of sufficient buoyancy to displace the diaphragm by localized pressure and operate the breaker arm to open the switch when the liquid level rises to a predetermined level.

2. In a liquid feed regulator, the combination with a casing including a tank chamber, an instrument chamber above and beside the tank chamber liquid sealed therefrom including a top closure for the tank chamber embodying a flexible diaphragm, and inlet and discharge passages connected with the tank chamber, the inlet passage including a valve chamber of a gravity closed valve in the valve chamber also extending into the instrument chamber, electrical means in the instrument chamber for opening the valve including a normally closed switch having a breaker arm cooperating with and contiguous to the diaphragm, and a float in the tank chamber of sufficient buoyancy to displace said diaphragm by localized pressure, operate the breaker arm and open the switch when the liquid in the tank reaches a predetermined level.

3. A liquid level controller comprising, in combination, a unitary casing, a top wall and a side wall dividing said casing into a liquid reservoir chamber and an instrument chamber with the instrument chamber having a portion thereof disposed directly above the reservoir chamber and a portion thereof disposed directly to the side thereof, inlet and discharge passages connected with the reservoir chamber, said inlet passage passing through a wall of the casing into the reservoir chamber and having a valve seat therein lying below said sidewardly disposed portion of the instrument chamber, a vertically movable valve element normally movable into engagement with said seat by gravity, a solenoid having its field in the sidewardly disposed portion of the instrument chamber and its core connected to said valve element with the movable parts of said valve element including the core sealed from said instrument chamber, an electric circuit in the instrument chamber and including connections to the solenoid field, a normally closed switch in said circuit and lying above said top wall and including a breaker arm, and means including a float in said reservoir chamber for actuating said breaker arm to open the switch when the liquid level rises to a predetermined level.

4. A liquid level controller comprising, in combination, a unitary casing, a top wall and a side wall dividing said casing into a liquid reservoir chamber and an instrument chamber with the instrument chamber having a portion thereof disposed directly above the reservoir chamber and a portion thereof disposed directly to the side thereof, inlet and discharge passages connected with the reservoir chamber, said inlet passage passing through a wall of the casing into the reservoir chamber and having a valve seat therein lying below said sidewardly disposed portion of the instrument chamber, a vertically movable valve element normally movable into engagement with said seat by gravity, a solenoid having its field in the sidewardly disposed portion of the instrument chamber and its core connected to said valve element with the movable parts of said valve element including the core sealed from said instrument chamber, an electric circuit in the instrument chamber and including connections to the solenoid field, a normally closed switch in said circuit and lying above said top wall and including a breaker arm, a diaphragm forming a part of said top wall and sealing the reservoir chamber from the instrument chamber, and means including a float in said reservoir chamber of sufficient buoyancy to displace the diaphragm by localized pressure and operate the breaker arm to open the switch when the liquid level rises to a predetermined level.

ARTHUR E. IRVING.

REFERENCES CITED

The following references are of record in the file of this patent:

UNITED STATES PATENTS

| Number | Name | Date |
|---|---|---|
| 1,870,416 | Lovel | Aug. 9, 1932 |
| 2,012,005 | Hammerly | Aug. 20, 1935 |
| 2,131,335 | Sullivan | Sept. 27, 1938 |
| 2,142,680 | Shrode | Jan. 3, 1939 |
| 2,145,199 | Kronmiller | Jan. 24, 1939 |
| 2,198,890 | Stilwell | Apr. 30, 1940 |
| 2,229,452 | Hammer | Jan. 21, 1941 |
| 2,295,097 | Waugh | Sept. 8, 1942 |
| 2,325,925 | Waugh | Aug. 3, 1943 |
| 2,343,806 | Scofield | Mar. 7, 1944 |
| 2,408,438 | Mills | Oct. 1, 1946 |